US010862600B2

(12) United States Patent
Clift

(10) Patent No.: US 10,862,600 B2
(45) Date of Patent: Dec. 8, 2020

(54) APPARATUS AND METHOD FOR AN ADVANCED TELEVISION SYSTEMS COMMITTEE (ATSC) 3.0 APPLICATION RUNNING ON A NON-ATSC 3.0 SERVICE

(71) Applicant: SONY CORPORATION, Tokyo (JP)

(72) Inventor: Graham Clift, San Diego, CA (US)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/199,096

(22) Filed: Nov. 23, 2018

(65) Prior Publication Data

US 2020/0169344 A1  May 28, 2020

(51) Int. Cl.
*H04H 60/19* (2008.01)
*H04H 20/10* (2008.01)
*H04H 60/15* (2008.01)
*H04H 60/39* (2008.01)

(52) U.S. Cl.
CPC .......... *H04H 60/19* (2013.01); *H04H 20/106* (2013.01); *H04H 60/15* (2013.01); *H04H 60/39* (2013.01)

(58) Field of Classification Search
CPC .... H04N 21/4383; H04N 21/84; H04N 21/44; H04N 21/4622; H04N 5/46; H04N 21/4382; H04N 21/4667; H04N 5/44513; H04N 21/2265; H04N 5/50; H04H 60/19; H04H 60/15; H04H 20/106; H04H 60/39; H04L 65/4076; H04W 88/04
USPC ....................................................... 455/3.01
See application file for complete search history.

(56) References Cited

U.S. PATENT DOCUMENTS 10,051,227 B1 *  8/2018  Shintani ............. H04N 21/4345
2018/0007309 A1 *  1/2018  Shintani ............. H04N 21/4382
2018/0139495 A1   5/2018  Eyer

FOREIGN PATENT DOCUMENTS

WO   WO 01/35660 A1    5/2001
WO   WO 2017/142754 A1  8/2017
WO   WO 2017/183403 A1  10/2017

OTHER PUBLICATIONS

International Search Report dated Jan. 29, 2020 in PCT/IB2019/060007, citing documents AA, AO through AQ therein, 14 pages.

* cited by examiner

*Primary Examiner* — Shaima Q Aminzay
(74) *Attorney, Agent, or Firm* — Oblon, McClelland, Maier & Neustadt, L.L.P.

(57) ABSTRACT

A reception apparatus includes a memory configured to store a television receiver application. The reception apparatus further includes processing circuitry configured to display, via a television broadcaster application, a user interface that provides a plurality of services for user selection. The processing circuitry is further configured to receive a user selection of a service from the plurality of displayed services. The processing circuitry is further configured to determine whether the selected service is an Advanced Television Systems Committee (ATSC) 1.0 service. In response to the determination that the selected service is the ATSC 1.0 service, the processing circuitry is further configured to continue execution of the television broadcaster application along with a display of the contents of the selected service.

11 Claims, 8 Drawing Sheets

APPARATUS AND METHOD FOR AN ADVANCED TELEVISION SYSTEMS COMMITTEE (ATSC) 3.0 APPLICATION RUNNING ON A NON-ATSC 3.0 SERVICE

BACKGROUND

Technical Field

The present disclosure is directed to an apparatus and method for executing an ATSC 3.0 application in conjunction with a non-ATSC 3.0 television service such as an ATSC 1.0 service.

Description of the Related Art

ATSC 3.0 defines a "runtime environment" that allows a digital television (DTV) receiver to download and execute broadcaster applications such as HTML5 applications in conjunction with broadcast television programming. Broadcaster applications can operate silently in the background to monitor, for example, the user's viewing habits to be able to better offer personalized content, or they can present user interfaces and invite user interaction. However, a broadcaster providing an ATSC 3.0 service may want a broadcaster application and/or native broadcaster application to continue to execute if the user switches to a non-ATSC 3.0 service of the broadcaster. Furthermore, a broadcaster may wish to have the DTV receiver launch a specific resident application (e.g., native application for an Android platform downloaded from the Google Play Store) when the user selects any service associated with that broadcaster (e.g., broadcast programming associated with that broadcaster, whether it is delivered in ATSC 3.0, ATSC 1.0, or other formats).

SUMMARY

According to an embodiment of the present disclosure, there is provided a reception apparatus that includes a memory configured to store a television receiver application. The reception apparatus further includes processing circuitry configured to display, via a television broadcaster application, a user interface that provides a plurality of services for user selection. The processing circuitry is further configured to receive a user selection of a service from the plurality of displayed services. The processing circuitry is further configured to determine whether the selected service is an Advanced Television Systems Committee (ATSC) 1.0 service. In response to the determination that the selected service is the ATSC 1.0 service, the processing circuitry is further configured to continue execution of the television broadcaster application along with a display of the contents of the selected service.

According to an embodiment of the present disclosure, there is provided a reception apparatus that includes a memory configured to store a television receiver application. The reception apparatus further includes processing circuitry configured to execute a television broadcaster application and a television receiver application. The processing circuitry is further configured to receive, by the television receiver application, a user selection of a service that is an ATSC 1.0 service. The processing circuitry is further configured to determine whether the selected service is associated with the television broadcaster application. In response to the determination that the selected service is associated with the television broadcaster application, the processing circuitry is further configured to continue the execution of the television broadcaster application along with a display of the ATSC 1.0 service.

According to an embodiment of the present disclosure, there is provided a non-transitory computer readable medium storing instructions, which when executed by a processor, causes the processor to perform a method including displaying, via a television broadcaster application, a user interface that provides a plurality of services for user selection. The method further includes receiving a user selection of a service from the plurality of displayed services. The method further includes determining whether the selected service is an Advanced Television Systems Committee (ATSC) 1.0 service. In response to the determination that the selected service is the ATSC 1.0 service, the method further includes continuing execution of the television broadcaster application along with a display of the contents of the selected service.

According to an embodiment of the present disclosure, there is provided a non-transitory computer readable medium storing instructions, which when executed by a processor, causes the processor to perform a method that includes executing a television broadcaster application and a television receiver application. The method further includes receiving, by the television receiver application, a user selection of a service that is an ATSC 1.0 service. The method further includes determining whether the selected service is associated with the television broadcaster application. In response to the determination that the selected service is associated with the television broadcaster application, the method further includes continuing the execution of the television broadcaster application along with a display of the ATSC 1.0 service.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
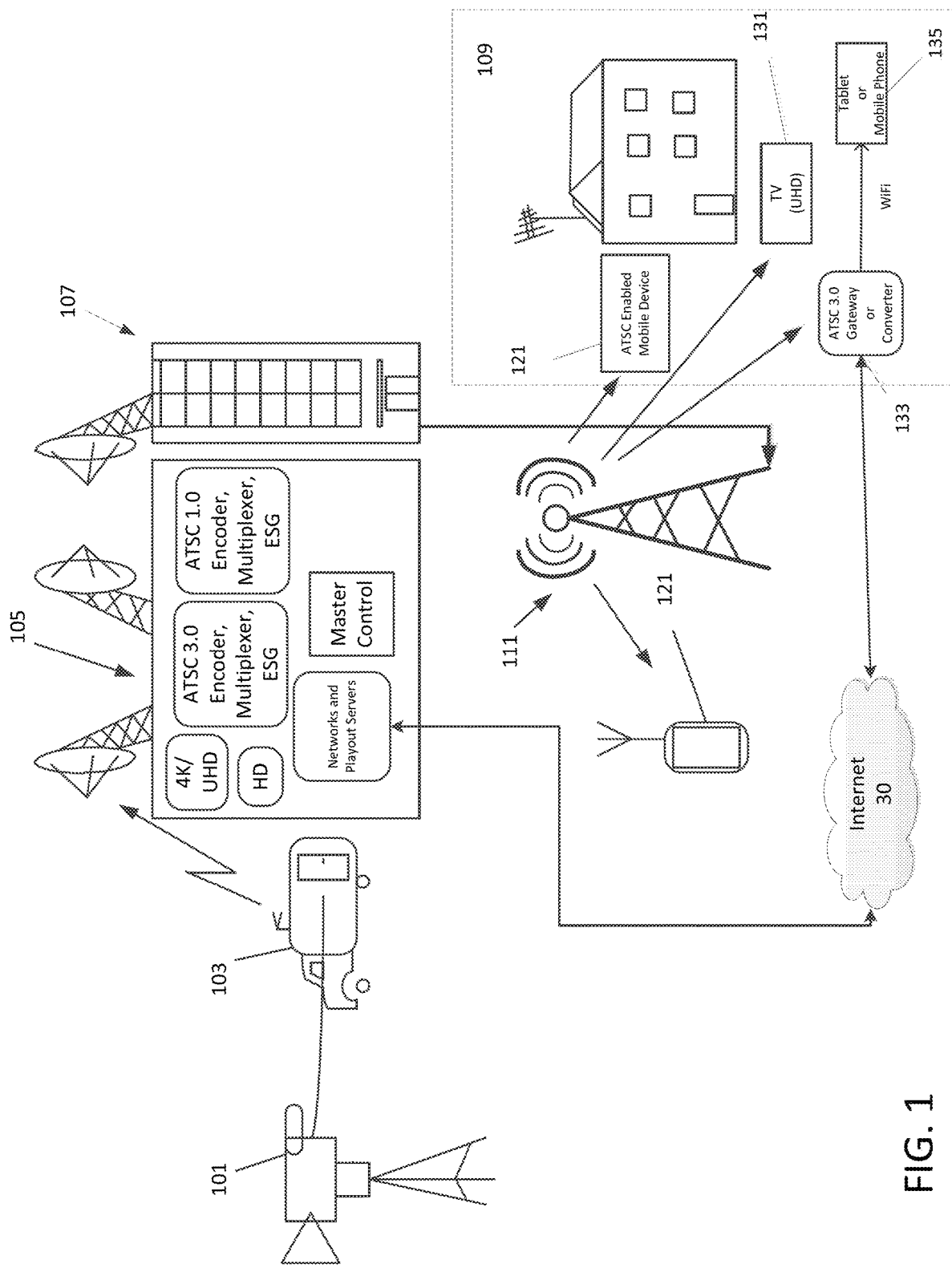
FIG. 1 is a schematic that shows basic components of a DTV system based on ATSC 3.0 standards.

While the present disclosure is susceptible of embodiment in many different forms, there is shown in the drawings and will herein be described in detail specific embodiments, with the understanding that the present disclosure of such embodiments is to be considered as an example of the principles and not intended to limit the present disclosure to the specific embodiments shown and described.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio/video content such as those which would be interpreted as and reported in an electronic service guide (ESG) as a single television program, without regard for whether the content is a movie, sporting event, segment of a multi-part series, news broadcast, etc. The term may also be interpreted to encompass commercial spots and other program-like content which may not be reported as a program in an ESG.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In the present disclosure, Android is a mobile operating system maintained by Google LLC. and was designed primarily for touchscreen devices. Application software runs on an application framework which includes a Java library based on Open JDK.

Some embodiments of the present disclosure involve non-TV devices such as a smartphone, tablet, laptop, etc. These types of devices are considered as non-TV devices because while these devices can stream content, they do not have the capability to tune to a television broadcast without additional hardware and software.

In some embodiments, an ATSC service is a collection of media components and/or metadata delivered to receivers in aggregate. Components may be of multiple media types. A service may be either continuous or intermittent. A service may include a sequence of TV Programs.

ATSC 3.0 can offer non-real time services. An example of a non-real time service includes video-on-demand or other interactive content like one might find on a web page. Also some or all components of an ATSC 3.0 service may be delivered via the broadband (internet) path. A service that includes components from both broadcast and broadband is called a "hybrid" service.

The ATSC 3.0 digital television standard adds standardized interactivity to the TV-watching experience by defining an environment in the receiver which supports execution of broadcaster applications (e.g., HTML5-based applications) provided by the broadcaster. During the transition from ATSC 1.0 (the current standard) to the new ATSC 3.0 standard, broadcasters may continue to operate both ATSC 1.0 services as well as the new ATSC 3.0 services. However, although ATSC 1.0 broadcasts do not include broadcaster applications, a broadcaster may desire to execute an application when the user is tuned to one of the broadcaster's ATSC 1.0 broadcasts.

Embodiments of the present disclosure are directed to allowing a broadcaster's application that has been launched in association with one of that broadcaster's ATSC 3.0 services to execute when the user selects an ATSC 1.0 service (e.g., virtual channel). The broadcaster's application may be a broadcaster application (e.g., HTML5 application) that has been downloaded from a digital TV broadcast stream, or the Internet, and launched in conjunction with an ATSC 3.0 service the user has selected. An HTML5 Application may include a collection of files comprised of an HTML5 document, known as the Entry Page and other HTML5, CSS, JavaScript, image and multimedia resources referenced directly or indirectly by that document. The HTML5 Application may be provided by the broadcaster as part of an ATSC 3.0 service. An Entry Page is the initial HTML5 document referenced by application signaling that may be loaded first into a User Agent. The User Agent may be any program in a reception apparatus that renders Web content.

An application created by a broadcaster may be a native broadcaster application, which is a type of application that runs natively on the same operating system platform used by the TV such as for example Android, iOS, MAC OS, Windows, or Tizen. The native broadcaster application is referred to as a "native" application, since the application (after being downloaded and installed, if not pre-installed at the time of manufacture) is present in the DTV receiver in a persistent way. For example, the native broadcaster application may be an Android application that is downloaded from an app store and executed on a reception apparatus built on an Android platform. The broadcaster application and native broadcaster application may both be referred to as "television broadcaster applications".

FIG. 1 is a diagram showing an arrangement of basic components for an ATSC 3.0 system that can also display ATSC 1.0 services. Video technology is moving from High Definition (HD) digital television to higher resolution technologies, including 4K and 8K video, High Dynamic Range (HDR), wide color gamut, and high frame rate. Subsequently, the ATSC 3.0 system may include a digital video camera 101 that can capture Ultra High Definition (UHD) video, possibly remotely in conjunction with a mobile transmission unit 103 that provides a signal for a TV station 105. The TV station 105 includes, among other things, facilities for television production and broadcast control. Using ATSC 3.0, an encoder and multiplexer may generate IP packets for a television broadcast. Using ATSC 1.0 standards (see ATSC A/53 Standard—ATSC Digital Television Standard, Part 3—Service Multiplex and Transport Subsystem, dated Aug. 7, 2013, the entirety of which is incorporated by reference), an encoder and multiplexer may generate an MPEG-2 Transport Stream for a television broadcast. The ATSC 1.0 and 3.0 broadcast signals may be communicated to one or more transmitter sites 107. A transmitter site may include ATSC 1.0 and ATSC 3.0 waveform transmitters that transmit radio frequency (RF) signals via a tower transmit antenna 111. The ATSC waveforms may be picked up in a home, office building, library, shop or restaurant 109 by an ATSC TV 131. The ATSC 3.0 broadcast may be received by the ATSC 3.0 Gateway or Converter 133, or an ATSC 3.0 enabled mobile device 121. A tablet or smartphone 135 may obtain the broadcast signal as a WiFi signal provided from the Gateway or Converter. Alternatively, outside a place of business or a home, suitably equipped tablets, smartphones or other mobile devices 121 may pick up the broadcast waveform from a tower transmit antenna 111. Such mobile devices 121 may be used within a personal vehicle or within a mode of public transportation. Furthermore, the ATSC 3.0 Gateway and Networks and Playout Servers in TV station 105 may communicate with each other via Internet 30.

Mobile operating systems, such as the Android operating system developed by Google LLC, are operating systems for phones, tablets, smartwatches, or other mobile devices and include features for mobile or handheld use. For example, mobile devices may include mobile features of cellular communication, Global Positioning System (GPS) navigation, video or single frame cameras, speech recognition, and typically a touchscreen. Examples of other mobile operating systems include iOS, Windows 10 Mobile, etc. In particular, the Android operating system has been designed primarily for touchscreen devices. Typically, application software for the Android operating system runs on an application framework which includes a Java library based on Open JDK (Java Development Kit).

In the present disclosure, a DTV broadcaster, or simply broadcaster as used herein, relates to a local television station that transmits content via radio waves as a terrestrial television transmission.

An ATSC 3.0 system has a layered architecture defined as a physical layer, protocols layer, management layer, and applications and presentation layer. Details of the ATSC 3.0 system is found in, for example, ATSC Standard A/300—ATSC 3.0 System, dated Oct. 19, 2017, the entirety of which is incorporated by reference (hereinafter "A/300 Standard"). At the transmitter side, the system architecture for an RF channel may include four main parts: Input Formatting, Bit Interleaved and Coded Modulation (BICM), Framing and Interleaving, and Waveform Generation. In the Input formatting and BICM parts, the Physical Layer Pipe (PLP) is a stream of data encoded with a specific modulation, code rate and length. There may be only a single PLP for an RF channel. The input formatting part formats input data packets into output packets called ATSC 3.0 Link Layer Protocol (ALP) packets. The length of each ALP packet is variable. The input formatting part maps the ALP packets to Baseband Packets, which include a header and a payload containing ALP packets. Baseband packets have fixed length, with the length determined by the outer code type, inner code rate and code length chosen for the target PLP.

Figure 2:
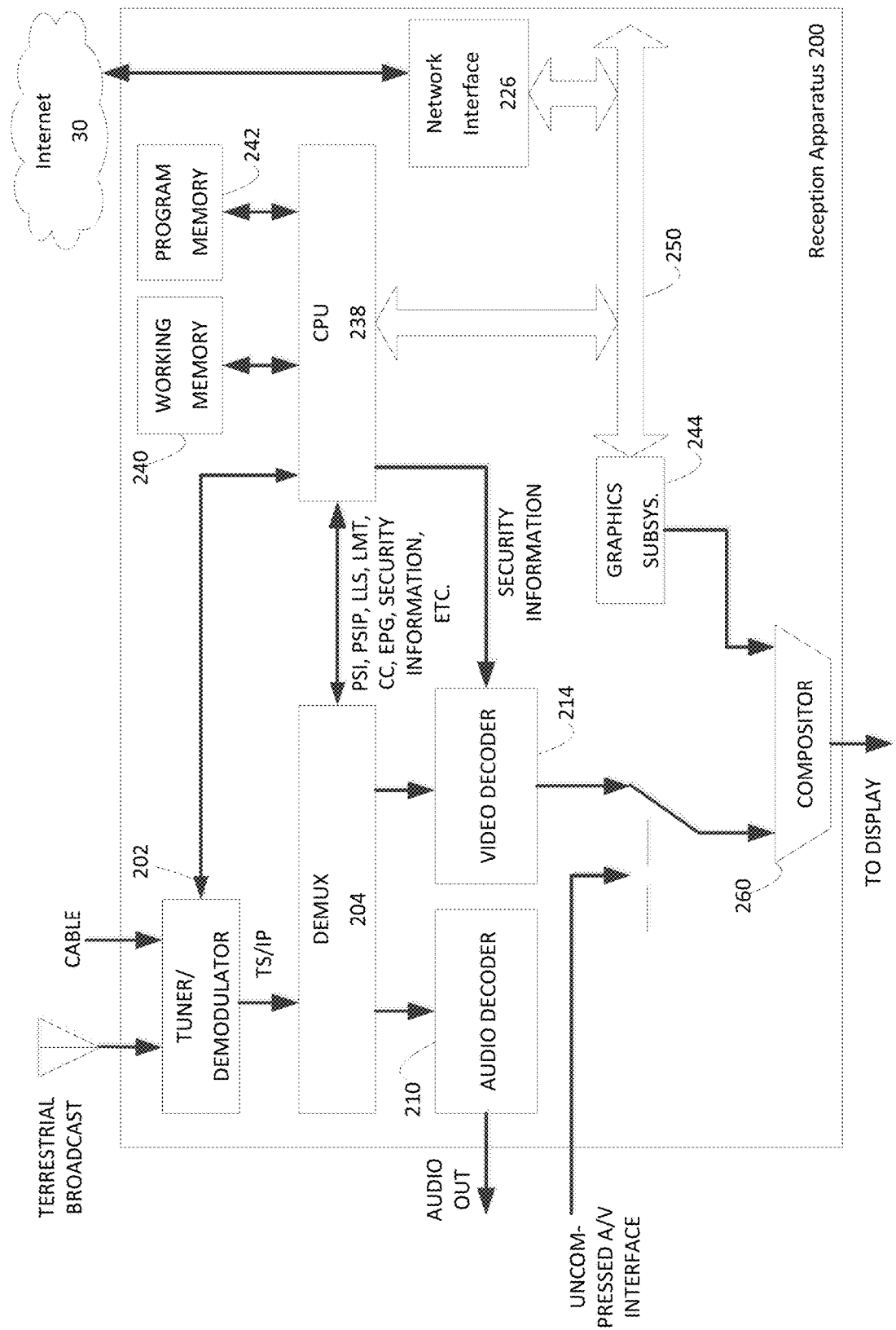
FIG. 2 illustrates an exemplary reception apparatus.

FIG. 2 illustrates an exemplary reception apparatus 200 included, for example, in TV 131 (FIG. 1), which is configured to access television content and broadcaster applications. The reception apparatus 200 may be a digital television receiver that is incorporated in a vehicle or any of the fixed or mobile devices described above.

The reception apparatus 200 includes receiver circuitry that is configured to receive a data stream (e.g., a broadcast stream) from broadcasters and processing circuitry that is configured to perform various functions of the reception apparatus 200. In one embodiment, a tuner/demodulator 202 receives broadcast emissions containing the broadcast stream. Depending on the embodiment, the reception apparatus 200 may alternatively or additionally be configured to receive a cable television transmission or a satellite broadcast. The reception apparatus 200 can also communicate with the Internet 30 via a network interface 226.

When an ATSC 3.0 broadcast emission has been acquired by the tuner/demodulator 202, data packets such as ALP packets are forwarded to an ALP to IP processor 270 that converts these packets to Internet Protocol (IP) packets for further processing. ALP packets may also be buffered and saved to persistent storage 280.

A demultiplexer 204 may demultiplex the data stream, which has been converted to IP packets, using any necessary files from storage 280, and deliver the demultipexed data to media engine 290 for decoding into separate audio and video (A/V) streams. Files that are outputted by the demultiplexer 204 such as metadata, Low Level Signaling (LLS) and the Service Layer Signaling (SLS) files, media files, and ESG files may be provided to the CPU 238 for processing. The audio is decoded by an audio decoder 210 and the video is decoded by a video decoder 214. Further, uncompressed A/V data may be received via an uncompressed A/V interface (e.g., a HDMI interface), if available.

The reception apparatus 200 generally operates under control of at least one processor, such as the CPU 238, which is coupled to the persistent storage 280, a working memory 240, program memory 242, and a graphics subsystem 244 via one or more buses (e.g., bus 250). The graphics outputted by the graphics subsystem 244 are combined with video images by the compositor and video interface 260 to produce an output suitable for display on a video display.

The CPU 238 operates to carry out functions of the reception apparatus 200 including executing script objects (control objects) contained in a broadcaster application (e.g., HTML5 application), a native broadcaster application, etc., using for example an HTML5 user agent stored in the program memory 242.

In one embodiment, the collection of files making up the broadcaster application can be delivered over broadcast as packages, via the ROUTE protocol described in ATSC Standard A/331—Signaling, Delivery, Synchronization, and Error Protection, dated Dec. 6, 2017, the entirety of which is incorporated by reference (hereinafter "A/331 Standard"). An exemplary broadcaster application is described in ATSC Standard A/344—ATSC 3.0 Interactive Content, dated Dec. 18, 2017, the entirety of which is incorporated by reference (hereinafter "A/344 Standard").

The CPU 238 may be coupled to any one or a combination of the reception apparatus 200 resources to centralize control of one or more functions, in certain embodiments. In one embodiment, the CPU 238 also operates to oversee control of the reception apparatus 200 including the tuner/demodulator 202 and other television resources.

Figure 3:
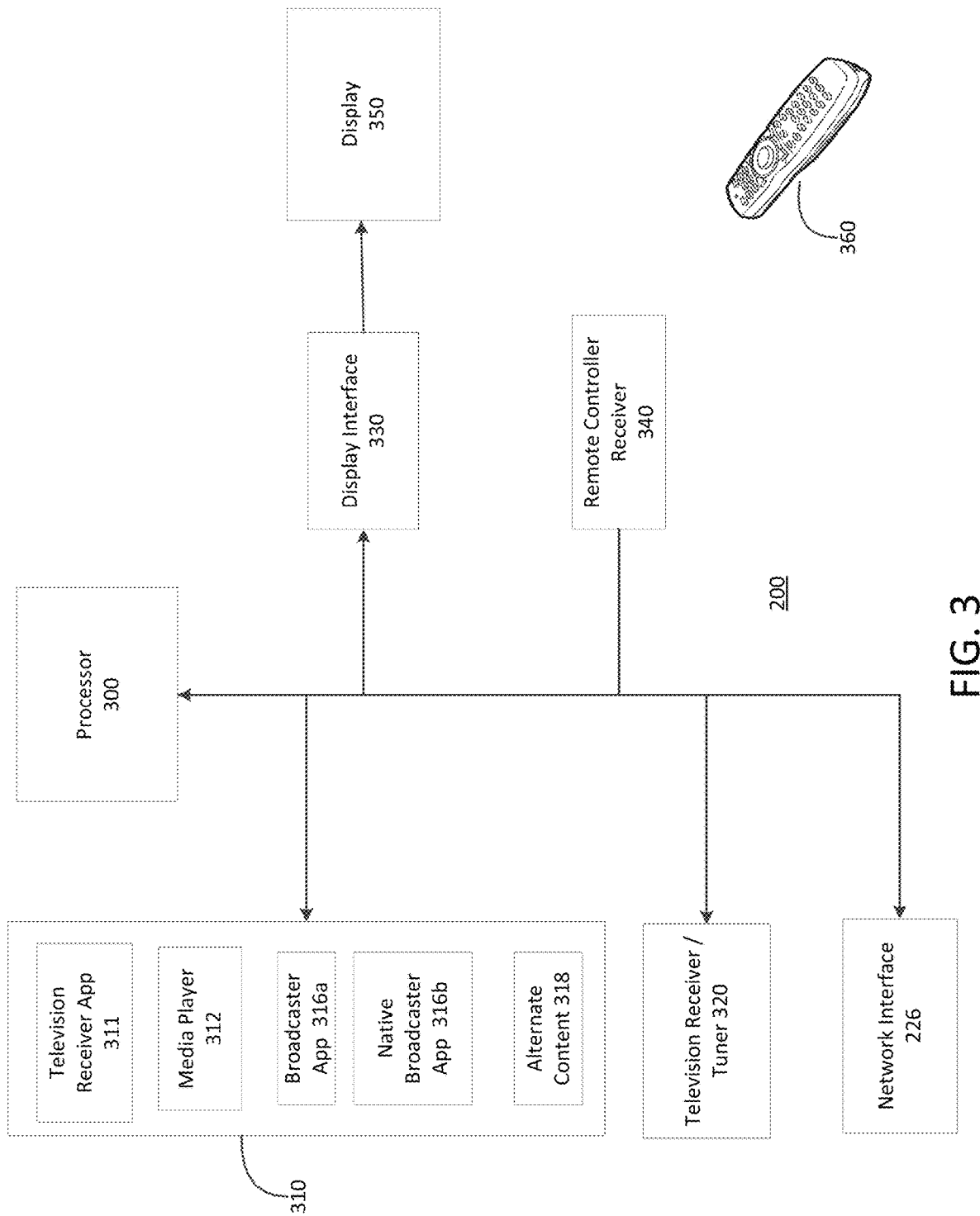
FIG. 3 is a processor-centric block diagram of an exemplary reception apparatus.

A more processor-centric view of the reception apparatus 200 is illustrated in FIG. 3. Memory 240 and 242 are depicted collectively as memory 310. Further, a processor 300 includes one or more processing units such as CPU 238. Similarly, the various demodulators, decoders, etc., that initially process digital television signals are collectively depicted as television receiver/tuner 320. The reception apparatus 200 further includes a remote controller 360 which communicates with a remote controller receiver interface 340. Additionally, the display 350 is connected to a display interface 330, which includes for example the uncompressed A/V interface and/or compositor 260, and is either a display integral to the reception apparatus 200 as in a television set or a connected display device as in the case where the reception apparatus 200 is integrated into a set-top box.

Memory 310 contains various functional program modules and data. The memory 310 stores the data used by the reception apparatus 200. The memory 310 within the reception apparatus 200 can be implemented using disc storage form as well as other forms of storage such as non-transitory storage devices including, for example, network memory devices, magnetic storage elements, magneto-optical storage elements, flash memory, core memory and/or other non-volatile storage technologies. The term "non-transitory" is a limitation of the medium itself (i.e., tangible, not a signal) as opposed to a limitation on data storage persistency (e.g., RAM vs. ROM).

The memory 310 includes the television receiver application 311 (e.g., an ATSC 3.0 Receiver Application). Both the broadcaster application 316a and native broadcaster application 316b are stored in the memory 310. The broadcaster application 316a may be an HTML5 application that is included in a broadcast stream. The native broadcaster application 316b may either be provided with the reception apparatus 200 or installed at a later time (e.g., downloaded from an app store). The broadcaster application 316a and native broadcaster 316b are executed by the processor 300. Further, these applications may cause the processor 300 to control the reception apparatus 200 to acquire alternate content 318, which is stored in the memory 310 for subsequent retrieval. In another embodiment, the processor 300 causes the reception apparatus 200 to retrieve or stream the alternate content 318 at the time of presentation.

Figure 4:
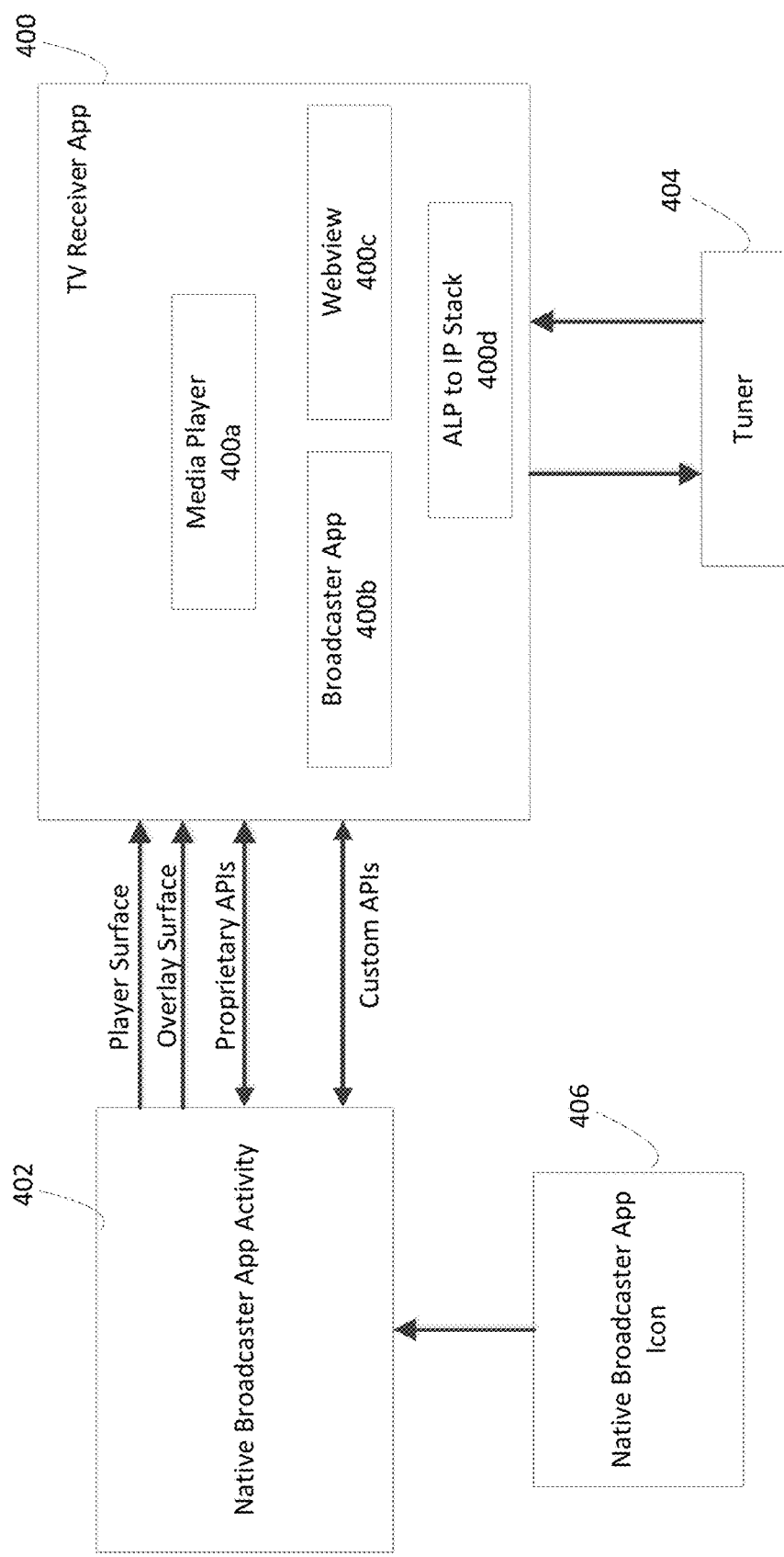
FIG. 4 illustrates an exemplary relationship between a television receiver application and a native broadcaster application.

FIG. 4 illustrates an embodiment of a relationship between a television receiver application 400 and a native broadcaster application 402 that is executed while a viewer is enjoying an ATSC service associated with the native broadcaster application 402. The native broadcaster application 402 may be visible to the user and activated by a displayed native broadcaster app icon 406. The television receiver application 400 may include a media player 400a that is configured to decode and render content. The television receiver application 400 is in communication with a tuner 404 that receives, for example, ALP packets in a television broadcast stream, where the ALP packets are converted to IP packets by an ALP to IP stack 400d. The television receiver application 400 may further include functionality in 400c such as WebView that is used to execute the broadcaster application 400b.

In the example illustrated in FIG. 4, the broadcaster may be ZTV and the native broadcaster application 402 may be called "ZTV-Now." This example illustrates that ZTV has provided a broadcaster application 400b that may execute in parallel with the native broadcaster application 402. The native broadcaster application 402 and broadcaster application 400b can communicate with the television receiver application 400 via custom APIs (e.g., "Custom APIs" in FIG. 4). The custom APIs may be specific to the DTV manufacturer or agreed upon between any combination of different DTV manufacturers and/or broadcasters. The television receiver application 400 provided by the DTV manufacturer can also support other proprietary APIs (e.g. "Proprietary APIs" in FIG. 4) usable by the native broadcaster application 402. Further, the native broadcaster application 402 could instruct the player surface to modify the display of video or the overlay surface to overlay a graphical output onto the video displayed on the player surface. For example, the native broadcaster application 402 instructs the player surface to scale the display of video to allow more display area for graphics. In another example, the native broadcaster application 402 provides a graphical output that is overlaid onto the video displayed on the player surface. Any reception apparatus operating system that supports native broadcaster applications and broadcaster applications provides functionality that allows applications to overlay graphics and text, on top of video, or on top of other graphics and text, under control of the executing applications.

There are several ways a user can transition from an ATSC 3.0 service to an ATSC 1.0 service while a television broadcaster application (e.g., broadcaster application or native broadcaster application) continues to run. In some embodiments, the transition from the ATSC 3.0 service to the ATSC 1.0 service occurs via an interaction with the television broadcaster application. For example, a user accesses an ATSC 3.0 service with a television broadcaster application. The television broadcaster application may offer a user interface that allows the user to choose a different service operated by that same broadcaster. The user chooses a different service and instructs the reception apparatus to acquire it. The television receiver application 400 may recognize that the television broadcaster application should continue to execute after acquisition of the newly chosen service and thus, keeps the television broadcaster application running.

In some embodiments, a user changes to an ATSC 1.0 service associated with a broadcaster that has broadcast or distributed television broadcaster application they would like to execute whenever this service (virtual channel) is being viewed. The appropriate television broadcaster application is launched when the user tunes to the ATSC 1.0 service by, for example, direct channel number entry on the remote control, channel surfing, or by interacting with the ESG in the reception apparatus.

In some embodiments, the reception apparatus 200 determines whether the newly acquired ATSC 1.0 service is operated by the same broadcaster as an ATSC 3.0 service for which it has a service-wide television broadcaster application. A service-wide application may be a television broadcaster application that is applicable to all programming that is broadcast on the service associated with the application. As an example, a broadcaster's native broadcaster application may be service-wide, whereas the broadcaster may offer a broadcaster application that is specific to particular programs. For example a particular broadcaster application may accompany a game show to provide interactivity with that program, or a specific broadcaster application may be broadcast with a national news broadcast to provide extra information about topics or advertisers (e.g., program specific broadcaster applications). Embodiments of the present disclosure describe methods to allow a television broadcaster application to execute in conjunction with a broadcaster's ATSC 1.0 service in some embodiments.

Figure 5:
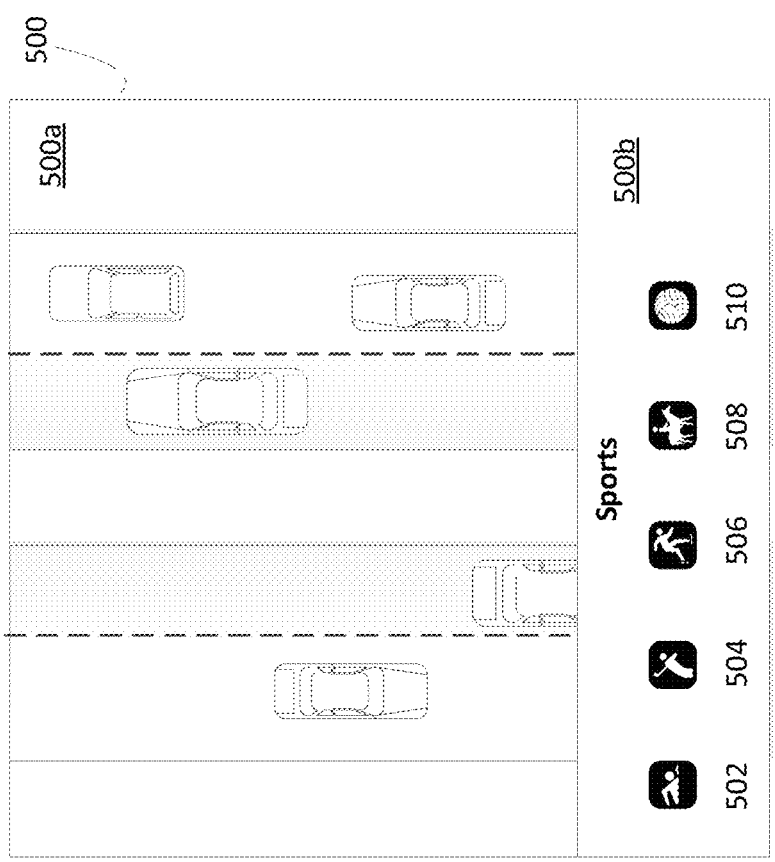
FIG. 5 illustrates an exemplary display of a Service and associated application.

In some embodiments, when a user has acquired an ATSC 3.0 service associated with Broadcaster A, the reception apparatus may launch a television broadcaster application provided by Broadcaster A. The user may interact with the television broadcaster application to select an ATSC 1.0 service offered by Broadcaster A. The reception apparatus acquires the ATSC 1.0 service, and the reception apparatus may continue to execute the same television broadcaster application. FIG. 5 illustrates an example display 500 that displays an ATSC 3.0 service 500a. Furthermore, a television broadcaster application 500b is provided with this ATSC 3.0 service. In this example, the television broadcaster application 500b displays service selections 500-508 provided by the broadcaster of the ATSC 3.0 service 500a. Each of the services 502-510 may be either an ATSC 3.0 service or an ATSC 1.0 service. The television broadcaster application 500b may allow selection of other non-ATSC 3.0 services in some embodiments.

In some embodiments, when a service is selected via an interaction with the television broadcaster application 400 (e.g., user selects one of services 502-510), the television broadcaster application provides a "tune" command to the television receiver application 400 to tune to the selected service. In this scenario, since the "tune" command is issued in response to a selection of a service displayed in a broadcaster's television broadcaster application, the television receiver application 400 can assume that the service being requested is one that the same broadcaster operates. Accordingly, in some embodiments, the television receiver application can keep the same television broadcaster application running until a change television broadcaster application is received.

An example of a change television broadcaster application signal is a HTML Entry pages Location Description (HELD) as described in ATSC Standard A/337—ATSC Standard: Application Signaling, dated Jan. 2, 2018, the entirety of which is incorporated by reference. When an HELD is received, the HELD can reference another broadcaster application. For example, referring to FIG. 5, when the television broadcaster application 500b is a broadcaster application, and a user selects a new service (e.g., either ATSC 3.0 or ATSC 1.0), the television receiver application 400 may receive a HELD. If the received HELD points to a different broadcaster application than broadcaster application 500b, then broadcaster application 500b is not provided with the newly selected service, and the television receiver application retrieves the broadcaster application referenced in the HELD.

A television broadcaster application generally does not know which ATSC 1.0 service a given reception apparatus can access. For example, in a certain geographic area, Broadcaster A might transmit several services in ATSC 3.0 format and several in ATSC 1.0 format. Depending on reception conditions, a given reception apparatus may be able to access the ATSC 3.0 services and not the ATSC 1.0 services. In some embodiments, an API lets the broadcaster's television broadcaster application discover which DTV signals (ATSC 3.0 services and ATSC 1.0 services) to which a reception apparatus has access.

For example, referring to FIG. 5, before the television broadcaster application 500b displays services 502-510 for user selection, the television broadcaster application 500b may query, via the API, the television receiver application 400 regarding accessible ATSC 3.0 and ATSC 1.0 services. Therefore, the television broadcaster application can present a user interface showing the programming options on other services, including those broadcast using a different DTV standard (ATSC 1.0 vs. ATSC 3.0). The user may select to switch services to one of the other offerings and potentially keep the same application running.

In some embodiments, if a reception apparatus has knowledge of an association between a television broadcaster application and an ATSC 1.0 service, the television broadcaster application associated with a given ATSC 1.0 service can be launched when the user changes to that ATSC 1.0 service. The television broadcaster application may be launched when the user selects the ATSC 1.0 service directly (e.g., user enters a <major>.<minor> channel number on the remote control, by navigating an ESG and selecting a service, or by "channel surfing" using the CH-UP and CH-DN buttons on the remote).

The knowledge of the linkage between a broadcaster's television broadcaster application and one or more ATSC 1.0 virtual channels may be learned in a variety of ways, including: (i) a television broadcaster application can tell the television receiver application 400, via the API, that a particular ATSC 1.0 virtual channel is part of its "Channel Group"; (ii) the television receiver application 400 can query, via a different API, the television broadcaster application to learn which ATSC 1.0 services the television broadcaster application is associated with; or (iii) for broadcaster applications, an API can be defined to extend the A/344 APIs to support a ATSC 1.0 service selection and query. An API can be created to allow the receiver manufacturer to interrogate the television broadcaster application to learn the required associations. When an API is created, the capabilities of the newly created API may be open ended based on how one of ordinary skill in the art designs the API.

In some scenarios, the television broadcaster application may command the television receiver application 400 to switch to an ATSC 1.0 service that the reception apparatus cannot access. When this situation arises, the television broadcaster application would know, via an API call querying the ID of the currently acquired service, that the service change failed.

A DTV manufacturer has the flexibility to define features and functions that broadcasters can program into their television broadcaster application that are only available when the television broadcaster application is executing in the DTV manufacturer's receiver. In some embodiments, the television broadcaster application determines which ATSC 3.0 and ATSC 1.0 signals to which a reception apparatus has access. In other embodiments, the television receiver application is able to determine which accessible ATSC 1.0 services are associated with the same broadcaster that has provided a given television broadcaster application.

An ATSC 1.0 service may be uniquely identified by the service's (i) TSID (Transport Stream ID, as described in the ATSC A/53 Standard) and (ii) and Major/Minor Virtual Channel Number (see ATSC A/65 Standard—ATSC Standard: Program and System Information Protocol for Terrestrial Broadcast and Cable, dated Aug. 7, 2013, the entirety of which is incorporated by reference). TSIDs may be unique on a regional level (e.g., North America), and major/minor channel numbers may be unique within a DTV service area.

In some embodiments, a television broadcaster application can identify whether an ATSC 1.0 service is operated by the same broadcaster that created the television broadcaster application based on the TSID, major_channel_number, and minor_channel_number. For example, a first ATSC 1.0 service that is associated with TSID_1, major_channel_number_1, and minor_channel_number_1 may be associated with Broadcaster A, whereas a second ATSC 1.0 service that is associated with TSID_2, major_channel_number_2, and minor_channel_number_2 may be associated with Broadcaster B.

In some embodiments, when the television broadcaster application requests a list of accessible ATSC 1.0 services, the response to the television broadcaster application is a list in the form of the [TSID, major_channel_number, minor_channel_number] for each accessible ATSC 1.0 service. In some embodiments, when the television receiver application 400 requests the television broadcaster application to provide a list of ATSC 1.0 services that are associated with the television broadcaster application, the television receiver application 400 receives a list in the form of the [TSID, major_channel_number, minor_channel_number] for each ATSC 1.0 service.

In some embodiments, the major channel number may be used as a branding mechanism for the broadcaster. For example, when the user accesses services 4.1, 4.2, or 4.<x>, all of these services may be recognized as being associated with the same broadcaster due to the common value of the major channel number. This understanding applies even in the case that some of the services are received on different RF channels. The API may be defined such that in response to the television receiver application querying the television broadcaster application as discussed above, the may be "any virtual channel with this same Major Channel Number."

Figure 6:
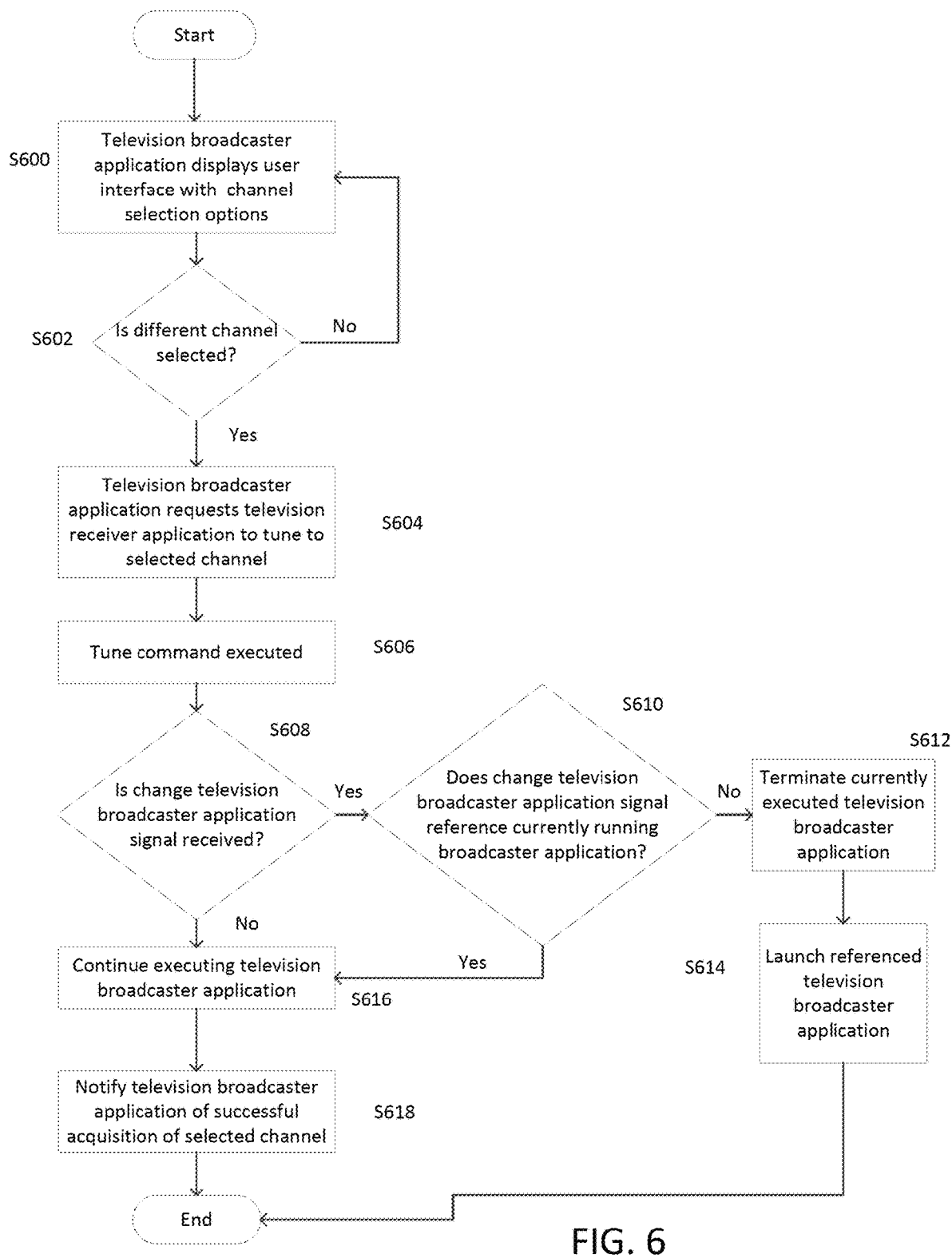
FIGS. 6 and 7 illustrate exemplary flow charts of processes performed by the reception apparatus.

FIG. 6 illustrates an embodiment of a process performed by the reception apparatus 200. The process may generally start at step S600 where a television broadcaster application displays a user interface with service selection options. For example, the user interface 500b, as illustrated in FIG. 5, is displayed along with service selection options 502-510.

The process proceeds to step S602 where it is determined if a different service is selected. If a different service is not selected, the processor returns to step S600. However, if a different service is selected, the process proceeds from step S602 to step S604 where the television broadcaster application requests the television receiver application 400 to tune to the selected service. As an example, referring to FIG. 5, the user may be watching service 500a, but selects any one of services 502 to 510, as displayed in user interface 500b. In this regard, the user has interacted with the television broadcaster application that causes the television receiver application 400 to acquire a different service.

When the user selects a service, the television receiver application 400 may send a command to the tuner (e.g., tuner 404) to tune to the RF channel corresponding to the selected service. The process proceeds to step S606 where the tune command is executed. In some embodiments, steps S604 and S606 may be skipped if the user selected service is already stored in a buffer in the reception apparatus 200.

The process proceeds to step S608 to determine if a change broadcaster application signal is received. For example, if the television broadcaster application that provides the user interface is a broadcaster application, it is determined whether a HELD has been received in step S608. Furthermore, it may be determined whether the HELD has been received within a predetermined time period. As understood by one of ordinary skill in the art, if the newly-acquired ATSC service is an ATSC 1.0 service, no HELD will be present.

If the change television broadcaster application signal is received, the process proceeds from step S608 to step S610 where it is determined whether the change television broadcaster application signal references the currently running television broadcaster application. For example, referring to FIG. 5, the change television broadcaster application signal may reference the television broadcaster application that displays user interface 500b. However, the change broadcaster application may also reference a different television broadcaster application. If the change television broadcaster application signal references a different television broadcaster application, the proceeds from step S610 to step S612 where the currently executed television broadcaster application is terminated. The process proceeds from step S612 to step S614 where the television broadcaster application referenced in the change television broadcaster application signal is launched.

Returning to step S610, if the change television broadcaster application signal references the currently running broadcaster application, the process proceeds from step S610 to step S616 where the execution of the currently running television broadcaster application is continued. The proceeds from step S616 to step S618 where the television broadcaster application is notified of the successful acquisition of the selected service. The television broadcaster application may be notified of the successful acquisition to prevent the television broadcaster application from taking the user to a channel that is not receivable. This notification of successful acquisition may be used for service usage monitoring and reporting since it may not be possible to prevent a user from accessing a channel that is otherwise not receivable. In some embodiments, services that are not discovered during a channel scan may not be included in the set of services that are offered for selection via the display (e.g., 500b).

Returning to step S608, if signaling to change the broadcaster application is not received, the process proceeds from step S608 to step S616 where process described above for step S616, and steps thereafter, are repeated.

Figure 7:
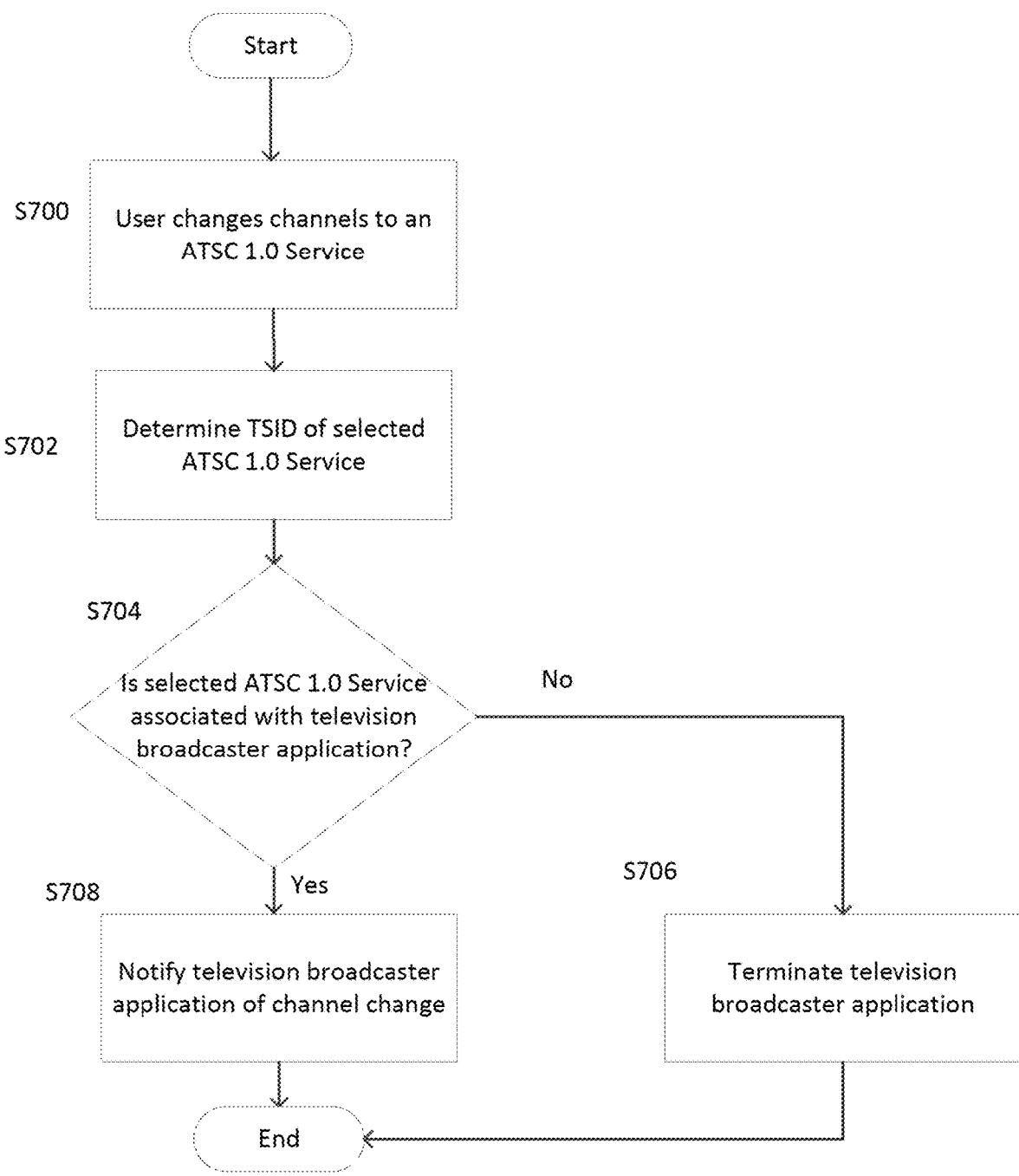

FIG. 7 illustrates an embodiment of a process performed by the reception apparatus 200. The process may generally start at step S700 where a user changes services to an ATSC 1.0 service. In the process of FIG. 7, a television broadcaster application may be currently running when the ATSC 1.0 service is selected. In contrast to the process illustrated in FIG. 6, the selection of the ATSC 1.0 service may occur by the user entering a <major channel>.<minor channel> number directly on a remote.

The process proceeds to step S702 where the TSID of the selected ATSC 1.0 service is determined. For example, when an ATSC 1.0 broadcast signal is acquired, there are MPEG-2 TS packets, some of which include the Program Association Table (PAT), which identifies the 16-bit TSID value. The tuner portion may pass the MPEG-2 TS packets to middleware that can inspect and parse these packets to find the TSID. Any receiver capable of accessing ATSC 1.0 services may discover TSIDs. An API may be used to communicate with the television receiver application if the native broadcaster app wants to know what TSID (and major/minor channel number) is currently acquired. An example of "custom" and "proprietary" APIs that can be used to communicate TSID and major/minor channel number is found in the application titled "Broadcaster Application Remote Control Key Handling," [INSERT APP. No.], the entire contents of which are incorporated by reference.

The process proceeds to step S704 to determine whether the selected ATSC 1.0 service is associated with the television broadcaster application. For example, the television receiver application may query the television broadcaster application, via the API, to receive a list of each ATSC 1.0 service that is associated with the queried television broadcaster application.

If the selected ATSC 1.0 service is not associated with the television broadcaster application, the process proceeds to step S706 where the currently running television broadcaster application is terminated. However, if the selected ATSC 1.0 service is associated with the currently running television broadcaster application, the process proceeds to step S708 where the television broadcaster application is notified of the service change.

Figure 8:
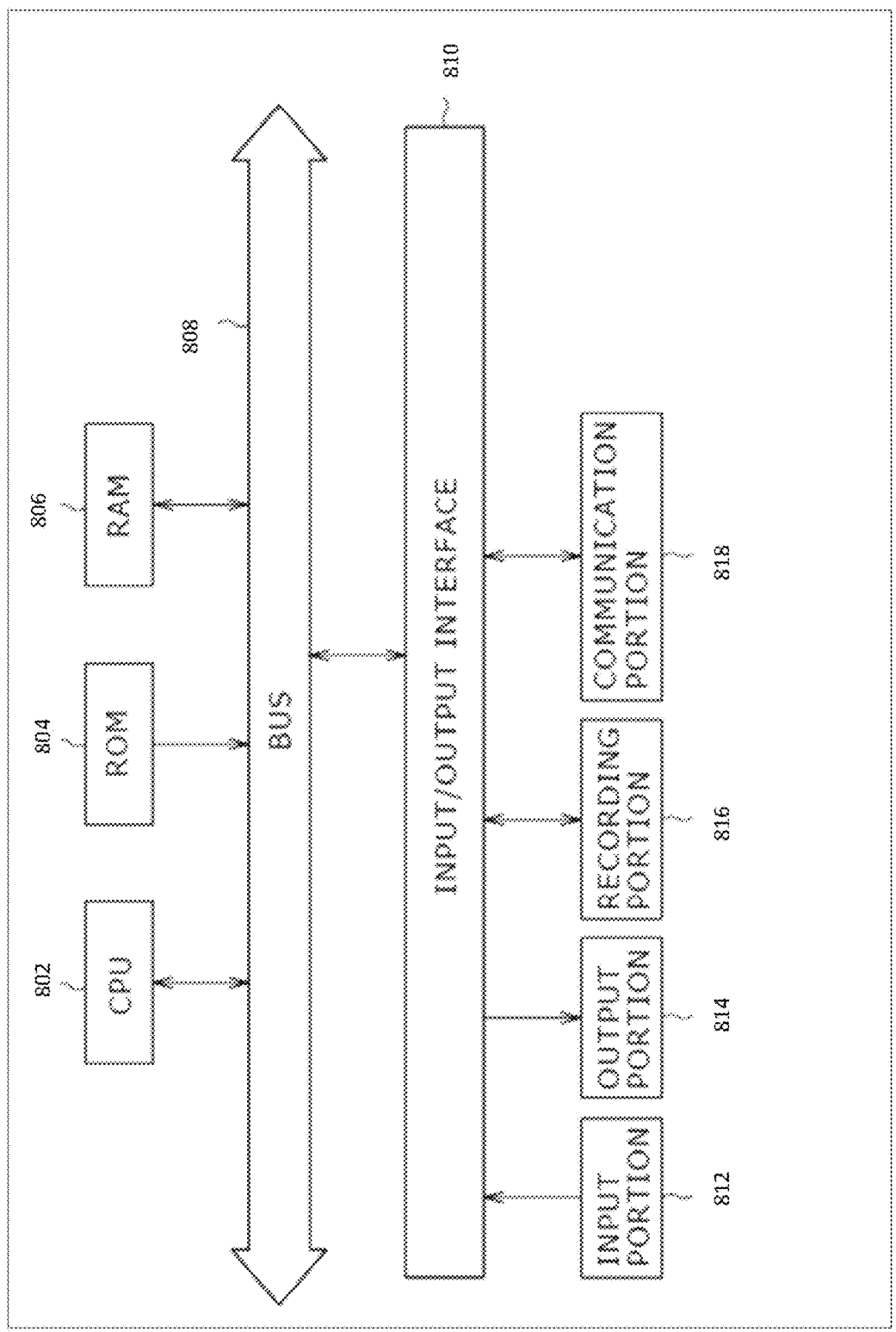
FIG. 8 illustrates an example hardware configuration of a computer.

FIG. 8 is a block diagram showing an example of a hardware configuration of a computer that can be configured to perform functions of any one or a combination of reception apparatus and service distribution system. For example, in one embodiment, the computer is configured to perform one or a combination of the functions or steps described herein with respect to the reception apparatus 20 and/or the service provider 102.

As illustrated in FIG. 8 the computer includes a CPU 802, ROM (read only memory) 804, and a RAM (random access memory) 806 interconnected to each other via one or more buses 808. The one or more buses 808 are further connected with an input-output interface 810. The input-output interface 810 is connected with an input portion 812 formed by a keyboard, a mouse, a microphone, remote controller, etc. The input-output interface 810 is also connected to an output portion 814 formed by an audio interface, video interface, display, speaker and the like; a recording portion 816 formed by a hard disk, a non-volatile memory or other non-transitory computer readable storage medium; and a communication portion 818 formed by a network interface, modem, USB interface, fire wire interface, etc.

According to one embodiment, the CPU 802 loads a program stored in the recording portion 816 into the RAM 806 via the input-output interface 810 and the bus 808, and then executes a program configured to provide the functionality of the one or a combination of the functions described herein with respect to the reception apparatus 200.

The hardware description above, exemplified by any one of the structure examples shown in FIGS. 2 and 8, constitutes or includes specialized corresponding structure that is programmed or configured to perform the algorithm describe above, for example with reference to FIGS. 6 and 7. For example, any one or a combination of the algorithms shown in FIGS. 6 and 7 may be completely performed by the circuitry included in the single device shown in FIG. 2.

Obviously, numerous modifications and variations are possible in light of the above teachings. It is therefore to be understood that within the scope of the appended claims, the present disclosure may be practiced otherwise than as specifically described herein.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the present disclosure is intended to be illustrative, but not limiting of the scope of the present disclosure, as well as other claims. The disclosure, including any readily discernible variants of the teachings herein, defines, in part, the scope of the foregoing claim terminology such that no inventive subject matter is dedicated to the public.

Embodiments of the present disclosure provide significantly advantageous features such as:

1. The ability for a broadcaster to provide interactivity or to execute a background application, by means of standards established for ATSC 3.0, while the viewer is enjoying an ATSC 1.0 service provided by that same broadcaster.
2. The ability for a broadcaster's application to signal to the reception apparatus the identities of ATSC 1.0 virtual channels that are associated with it.
3. The ability for a reception apparatus to notify or report to a broadcaster's television broadcaster application the identities of ATSC 1.0 services that a reception apparatus can access.

The above disclosure also encompasses the embodiments listed below.

(1) A reception apparatus including a memory configured to store a television receiver application; and processing circuitry configured to display, via a television broadcaster application, a user interface that provides a plurality of services for user selection, receive a user selection of a service from the plurality of displayed services, determine whether the selected service is an Advanced Television Systems Committee (ATSC) 1.0 service, and in response to the determination that the selected service is the ATSC 1.0 service, continue execution of the television broadcaster application along with a display of the contents of the selected service.

(2) The reception apparatus according to feature (1), in which the processing circuitry is further configured to determine whether a change television broadcaster application command is received, in response to the determination that the change television broadcaster application command is received, determine whether the change television broadcaster application command specifies another television broadcaster application, and change the television broadcaster application to the another television broadcaster application in response to the determination that the television broadcaster application command specifies the another television broadcaster application.

(3) The reception apparatus according to feature (1) or (2), in which the processing circuitry is further configured to query, by the television broadcaster application to the television receiver application, for information regarding each ATSC 1.0 service that the receiver apparatus is capable of accessing, and receive, by the television broadcaster application from the television receiver application in response to the query, a list of each ATSC 1.0 service that the receiver apparatus is capable of accessing.

(4) The reception apparatus according to feature (3), in which the processing circuitry is configured to determine each ATSC 1.0 service from the received list that is associated with the television broadcaster application, wherein each ATSC 1.0 service associated with the television broadcaster application is included in the displayed plurality of services.

(5) The reception apparatus according to any one of features (1)-(4), in which the television broadcaster application is one of a broadcaster application included in a digital television broadcast stream or a native broadcaster application stored in the memory.

(6) A reception apparatus including a memory configured to store a television receiver application and processing circuitry configured to execute a television broadcaster application and a television receiver application, receive, by the television receiver application, a user selection of a service that is an ATSC 1.0 service, determine whether the selected service is associated with the television broadcaster application, and in response to the determination that the selected service is associated with the television broadcaster application, continue the execution of the television broadcaster application along with a display of the ATSC 1.0 service.

(7) The reception apparatus according to feature (6), in which the determination of whether the television broadcaster application is associated with the selected service includes the television broadcaster application sending an indication to the television receiver application that the selected service is associated with the broadcaster application.

(8) The reception apparatus according to feature (6), in which the determination of whether the television broadcaster application is associated with the selected service includes: (i) the television receiver application sending a query to the television broadcaster application, and (ii) in response to the query, the television broadcaster application sending to the television receiver application an indication that the selected service is associated with the television broadcaster application.

(9) The reception apparatus according feature (7), in which the indication includes a transport stream ID (TSID), a major channel number, and a minor channel number associated with the ATSC 1.0 service.

(10) The reception apparatus according to any one of features (6)-(9), in which the television broadcaster application is one of a broadcaster application included in a digital television broadcast stream or a native broadcaster application stored in the memory.

(11) A non-transitory computer readable medium storing instructions, which when executed by a processor, causes the processor to perform a method including displaying, via a television broadcaster application, a user interface that provides a plurality of services for user selection; receiving a user selection of a service from the plurality of displayed services; determining whether the selected service is an Advanced Television Systems Committee (ATSC) 1.0 service; and in response to the determination that the selected service is the ATSC 1.0 service, continuing execution of the television broadcaster application along with a display of the contents of the selected service.

(12) The non-transitory computer readable medium according to feature 11, in which the method further includes determining whether a change television broadcaster application command is received; in response to the determination that the change television broadcaster application command is received, determining whether the change television broadcaster application command specifies another television broadcaster application; and changing the television broadcaster application to the another television broadcaster application in response to the determination that the television broadcaster application command specifies the another television broadcaster application.

(13) The non-transitory computer readable medium according to feature (11) or (12), in which the processing circuitry is further configured to query, by the television broadcaster application to the television receiver application, for information regarding each ATSC 1.0 service that the receiver apparatus is capable of accessing, and receive, by the television broadcaster application from the television receiver application in response to the query, a list of each ATSC 1.0 service that the receiver apparatus is capable of accessing.

(14) The non-transitory computer readable medium according to feature (13), in which the method further includes determining each ATSC 1.0 service from the received list that is associated with the television broadcaster application, wherein each ATSC 1.0 service associated with the television broadcaster application is included in the displayed plurality of services.

(15) The non-transitory computer readable medium according to any one of features (11)-(14), in which the television broadcaster application is one of a broadcaster application included in a digital television broadcast stream or a native broadcaster application stored in the memory.

(16) A non-transitory computer readable medium storing instructions, which when executed by a processor, causes the processor to perform a method including executing a television broadcaster application and a television receiver application, receiving, by the television receiver application, a user selection of a service that is an ATSC 1.0 service, determining whether the selected service is associated with the television broadcaster application, and in response to the determination that the selected service is associated with the television broadcaster application, continuing the execution of the television broadcaster application along with a display of the ATSC 1.0 service.

(17) The non-transitory computer readable medium according to feature (16), in which the determination of whether the television broadcaster application is associated with the selected service includes the television broadcaster application sending an indication to the television receiver application that the selected service is associated with the broadcaster application.

(18) The non-transitory computer readable medium according to features (16) or (17), in which the determination of whether the television broadcaster application is associated with the selected service includes: (i) the television receiver application sending a query to the television broadcaster application, and (ii) in response to the query, the television broadcaster application sending to the television receiver application an indication that the selected service is associated with the television broadcaster application.

(19) The non-transitory computer readable medium according to features (17) or (18), in which the indication includes a transport stream ID (TSID), a major channel number, and a minor channel number associated with the ATSC 1.0 service.

(20) The non-transitory computer readable medium according to any one of features (16)-(19), in which the television broadcaster application is one of a broadcaster application included in a digital television broadcast stream or a native broadcaster application stored in the memory.

The invention claimed is:

1. A reception apparatus comprising:
a memory configured to store a television receiver application; and
processing circuitry configured to:
   display an initial Advanced Television Systems Committee (ATSC) service;
   display, via a television broadcaster application while the initial ATSC service is displayed, a user interface that provides a plurality of services for user selection,
   receive a user selection of an ATSC 1.0 service from the plurality of displayed services, and
   change the display of the initial ATSC service to a display of the selected ATSC 1.0 service and continue execution of the television broadcaster application and the display of the user interface along with the display of the selected ATSC 1.0 service.

2. The reception apparatus according to claim 1, wherein the processing circuitry is further configured to:
   determine whether a change television broadcaster application command is received,
   in response to the determination that the change television broadcaster application command is received, determine whether the change television broadcaster application command specifies another television broadcaster application, and
   change the television broadcaster application to the another television broadcaster application in response to the determination that the change television broadcaster application command specifies the another television broadcaster application.

3. The reception apparatus according to claim 1, wherein the processing circuitry is further configured to:
   query, by the television broadcaster application to the television receiver application, for information regarding each ATSC 1.0 service that the reception apparatus is capable of accessing, and receive, by the television broadcaster application from the television receiver application in response to the query, a list of each ATSC 1.0 service that the reception apparatus is capable of accessing.

4. The reception apparatus according to claim 3, wherein the processing circuitry is configured to:
determine each ATSC 1.0 service from the received list that is associated with the television broadcaster application, wherein each ATSC 1.0 service associated with the television broadcaster application is included in the displayed plurality of services.

5. The reception apparatus according to claim 1, wherein the television broadcaster application is one of a broadcaster application included in a digital television broadcast stream or a native broadcaster application stored in the memory.

6. The reception apparatus of claim 1, wherein the initial ATSC service is an ATSC 3.0 service.

7. A non-transitory computer readable medium storing instructions, which when executed by a processor in a reception apparatus, causes the processor to perform a method comprising:
displaying an initial Advanced Television Systems Committee (ATSC) service;
displaying, via a television broadcaster application while the initial ATSC service is displayed, a user interface that provides a plurality of services for user selection;
receiving a user selection of an ATSC 1.0 service from the plurality of displayed services; and
changing the display of the initial ATSC service to a display of the selected ATSC 1.0 service and continuing execution of the television broadcaster application and the display of the user interface along with a display of the selected ATSC 1.0 service.

8. The non-transitory computer readable medium according to claim 7, wherein the method further comprises:
determining whether a change television broadcaster application command is received;
in response to the determination that the change television broadcaster application command is received, determining whether the change television broadcaster application command specifies another television broadcaster application; and
changing the television broadcaster application to the another television broadcaster application in response to the determination that the change television broadcaster application command specifies the another television broadcaster application.

9. The non-transitory computer readable medium according to claim 7, the method further comprising:
querying, by the television broadcaster application to a television receiver application, for information regarding each ATSC 1.0 service that the reception apparatus is capable of accessing; and
receiving, by the television broadcaster application from the television receiver application in response to the query, a list of each ATSC 1.0 service that the reception apparatus is capable of accessing.

10. The non-transitory computer readable medium according to claim 9, the method further comprises:
determining each ATSC 1.0 service from the received list that is associated with the television broadcaster application, wherein each ATSC 1.0 service associated with the television broadcaster application is included in the displayed plurality of services.

11. The non-transitory computer readable medium according to claim 7, wherein the television broadcaster application is one of a broadcaster application included in a digital television broadcast stream or a native broadcaster application stored in a memory of the reception apparatus.

* * * * *